United States Patent [19]

Kang

[11] Patent Number: 5,734,517
[45] Date of Patent: Mar. 31, 1998

[54] DEVICE FOR REGULATING MOTOR-DRIVEN FOLDABLE REAR VIEW MIRROR OF AUTOMOBILE

[75] Inventor: Gi-Dong Kang, Kwangmyong, Rep. of Korea

[73] Assignee: Poong Jeong Ind. Co., Ltd., Kyunggi-do, Rep. of Korea

[21] Appl. No.: 526,604

[22] Filed: Sep. 11, 1995

[51] Int. Cl.⁶ .................... G02B 5/08; G02B 7/18; B60R 1/06
[52] U.S. Cl. .................... 359/877; 359/841; 248/478
[58] Field of Search ........................ 359/841, 872, 359/877; 248/478, 479, 483, 900

[56] References Cited

U.S. PATENT DOCUMENTS

| | | | |
|---|---|---|---|
| 4,626,084 | 12/1986 | Kumai | 359/877 |
| 4,681,409 | 7/1987 | Enomoto | 359/877 |
| 4,832,477 | 5/1989 | Torii et al. | 359/877 |
| 4,919,526 | 4/1990 | Umekawa et al. | 359/877 |
| 4,981,349 | 1/1991 | Tamiya et al. . | |
| 5,166,832 | 11/1992 | Zychowicz . | |
| 5,190,499 | 3/1993 | Mori et al. | 359/877 |
| 5,369,530 | 11/1994 | Yamauchi et al. | 359/872 |
| 5,384,660 | 1/1995 | Oishi | 359/841 |
| 5,432,641 | 7/1995 | Mochizuki | 359/872 |
| 5,477,392 | 12/1995 | Mochizuki et al. | 359/877 |
| 5,523,894 | 6/1996 | Koiwai | 359/877 |
| 5,594,590 | 1/1997 | Ishiyama | 359/841 |

FOREIGN PATENT DOCUMENTS 1-237235  9/1989  Japan .

*Primary Examiner*—Ricky D. Shafer
*Attorney, Agent, or Firm*—Merchant, Gould, Smith Edell, Welter & Schmidt

[57] ABSTRACT

A device for regulating a motor-driven foldable rear view mirror of an automobile is disclosed. The device has a shaft reinforcing ring having a plurality of U-shaped slots on its upper outside edge, and a frame reinforcing ring having a plurality of V-shaped slots on its upper inside edge. The frame reinforcing ring is placed about the shaft reinforcing ring, so that their slots are opposed to each other respectively. A plurality of regulating balls are seated on the slots of the reinforcing rings and placed in guide depressions of a shaft gear, so that the balls can move radially of the shaft. The reinforcing rings are tightly compressed by a compression coil spring and tightly kept in their places during the operation of the device.

1 Claim, 3 Drawing Sheets

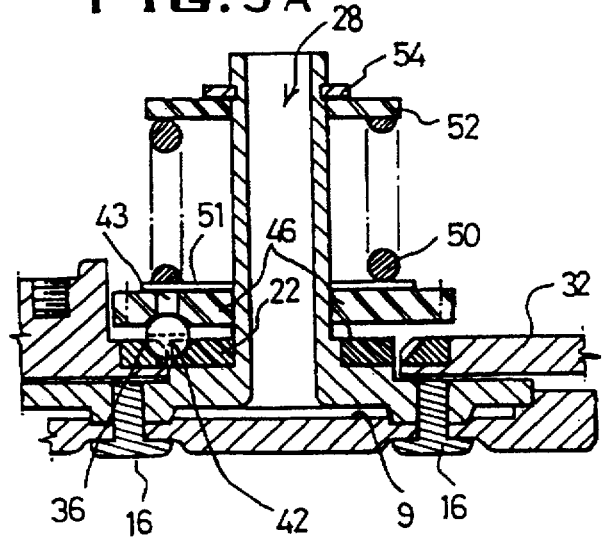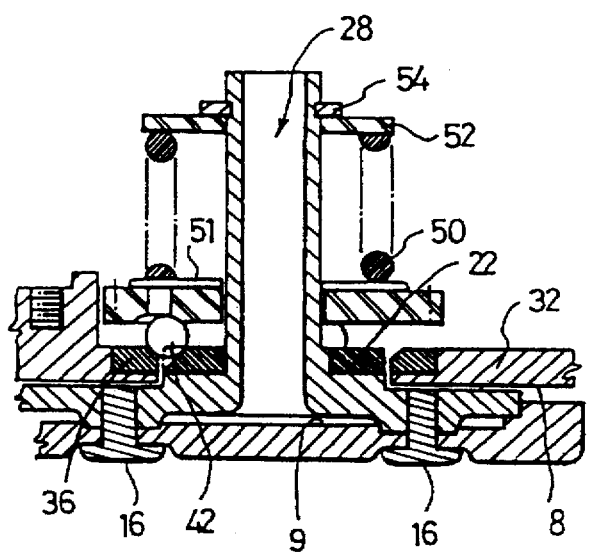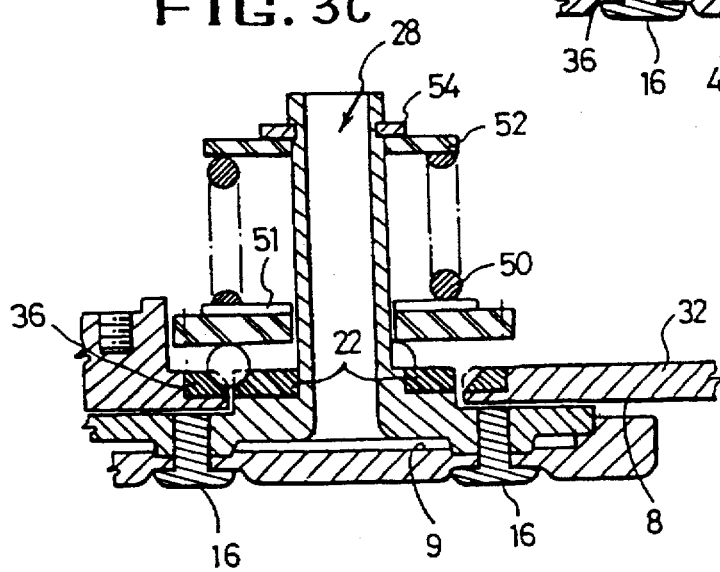

5,734,517

DEVICE FOR REGULATING MOTOR-DRIVEN FOLDABLE REAR VIEW MIRROR OF AUTOMOBILE

BACKGROUND OF THE INVENTION

1. Field of the invention

The present invention relates in general to a device for regulating a motor-driven foldable rear view mirror of an automobile and, more particularly, to a structural improvement in such a regulating device for reducing the number of regulating elements, for preventing random motion of a mirror housing, for automatically returning the mirror housing to its controlled position even in the case of minute displacement of the mirror housing due to external impact, for reducing the cost of such rear view mirror, for achieving desired rigidity of the rear view mirror and for providing a safe backward sight for a driver by reliably keeping a controlled position of the rear view mirror.

2. Description of the Prior Art

As well known to those skilled in the art, a motor-driven foldable rear view mirror of an automobile is provided with a regulating device suitable for regulating the folding positions of a mirror housing relative to an automobile body. The mirror regulating device also automatically returns the mirror housing to the controlled position even when the mirror housing is randomly displaced due to external impact or due to operational vibration of a motor when the rear view mirror is controlled in its position by turning the mirror housing about a shaft fixed to a base plate on the automobile body. Therefore, the above regulating device provides a safe backward sight for a driver of the automobile and lets the driver make safe driving.

An example of the typical devices for regulating the motor-driven foldable rear view mirrors is disclosed in Japanese Patent Laid-open Publication No. Heisei. 1-237235. In this regulating device, a drive motor is mounted to a mirror housing frame. The drive motor outputs its rotational force through reduction gears whose end gear gears into a clutch gear mounted to the fixing shaft of the mirror housing. A spring as a biasing member is placed on the clutch gear, so that the spring presses down the housing frame toward the base plate. In addition, a plurality of V-shaped slots are formed on the bottom surface of the clutch gear as well as on the top surface of the housing frame, so that the V-shaped slots of the clutch gear are opposed to the V-shaped slots of the housing frame. Here, the V-shaped slots are adapted for auxiliary support of a plurality of regulating members, which members are placed in a plurality of guide depressions of the fixing shaft respectively.

However, the above regulating device causes a problem in its operation. That is, when folding the mirror housing relative to the automobile body by the motor drive, the regulating members along with the clutch gear are lifted up as the engaging force between the regulating members and the V-shaped slots of the clutch gear is stronger than the engaging force between the regulating members and the V-shaped slots of the housing frame. In this case, the V-shaped slots of the housing frame move out of the controlled engagement with the regulating members to allow a regulated rotation of the housing frame. However, when the mirror housing is suddenly applied with an external force, the regulating members along with the clutch gear are liable to bounce under the compressing force of the biasing spring while both the V-shaped slots of the frame and the V-shaped slots of the clutch gear become out of engagement with the regulating members simultaneously, thus to cause failure of the regulating device.

SUMMARY OF THE INVENTION

It is, therefore, an object of the invention to provide a device for regulating a motor-driven foldable rear view mirror of an automobile in which the above problems can be overcome and which reduces the number of regulating elements, reduces the cost of the rear view mirror, prevents random motion of a mirror housing, automatically returns the mirror housing to its controlled position even in the case of minute displacement of the mirror housing due to external impact, achieves desired rigidity of the rear view mirror and provides a safe backward sight for a driver by reliably keeping a controlled position of the rear view mirror.

In order to accomplish the above object, the present invention provides a regulating device for a motor-driven foldable rear view mirror of an automobile comprising a shaft coupled to a base plate externally mounted to an automobile body, a frame placed about the shaft for supporting a mirror housing foldably over the automobile, a drive unit fixed to the frame, a plurality of reduction gears connected to the drive unit and having an end gear, and a shaft gear gearing into the end gear so as to move the mirror housing centering around the shaft by rotational force of the drive unit, further comprising, a first flat ring fitted over a lower section of the shaft and having a plurality of U-shaped slots on its upper outside edge, a second flat ring seated on a seat of the frame and placed about the first flat ring and having a plurality of V-shaped slots on its upper inside edge, a plurality of regulating members seated on the slots of the first and second flat rings and placed in guide depressions of the shaft gear respectively so as to be moved radially of the shaft, and a spring placed on the shaft gear and compressing the flat rings so as to let the frame be rotated about the shaft under the condition that the flat rings are kept in their places with the regulating members caught in a generally spherical space defined by the guide depressions of the shaft gear and the slots of the first and second flat rings.

BRIEF DESCRIPTION OF THE DRAWINGS

The above and other objects, features and other advantages of the present invention will be more clearly understood from the following detailed description taken in conjunction with the accompanying drawings, in which:

FIGS. 3A to 3C are schematic sectional views showing operations of the regulating device of FIG. 2 respectively, in which:

FIG. 3A shows the regulating device in a normal state;

FIG. 3B shows the regulating device in a state for electrically controlling the rear mirror; and FIG. 3C shows the regulating device in a state for electrically controlling the rear mirror against external impact.

DESCRIPTION OF THE PREFERRED EMBODIMENTS

Figure 1:
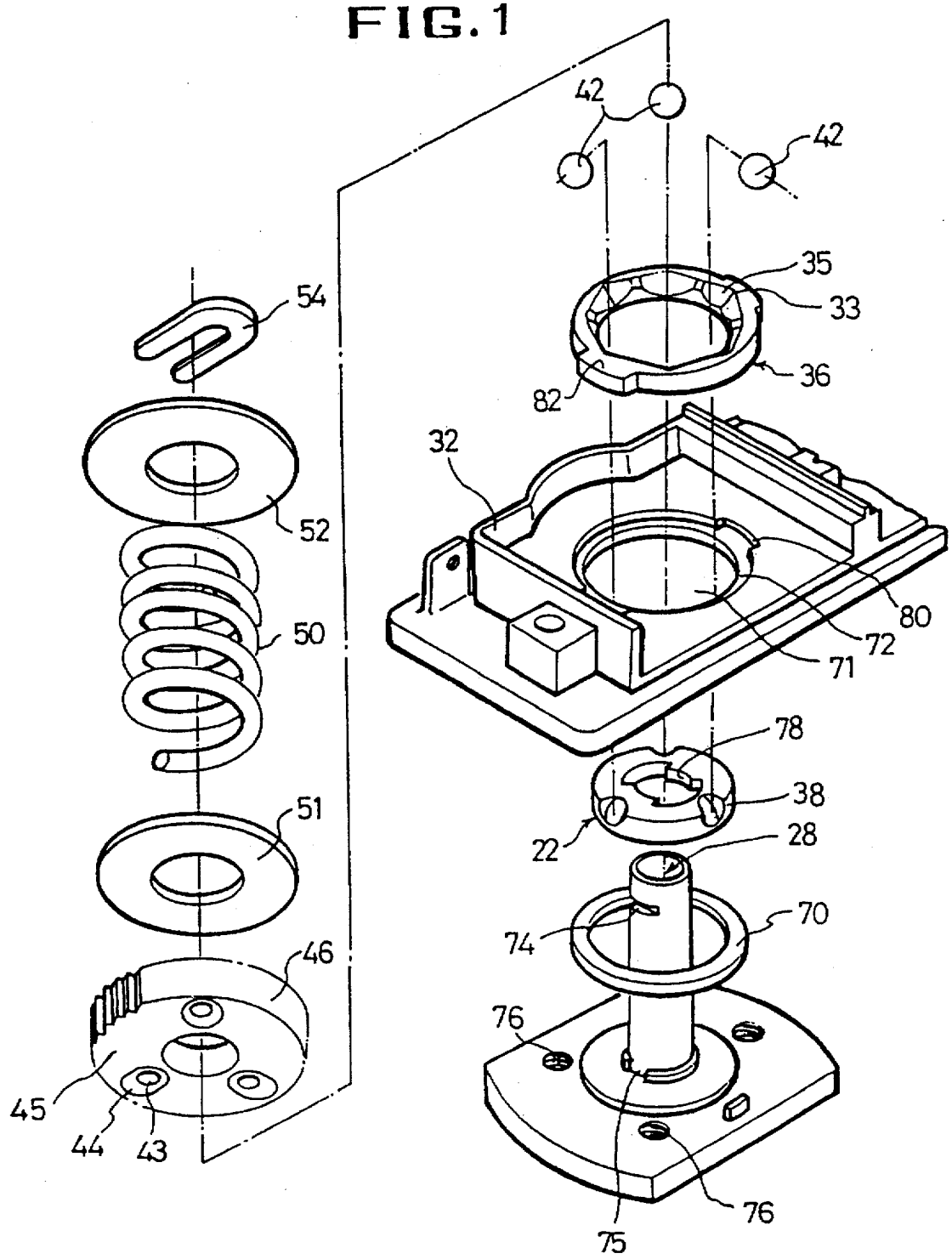
FIG. 1 is an exploded perspective view of a regulating device for an electrically controllable rear mirror in accordance with a preferred embodiment of the present invention.
Figure 2:
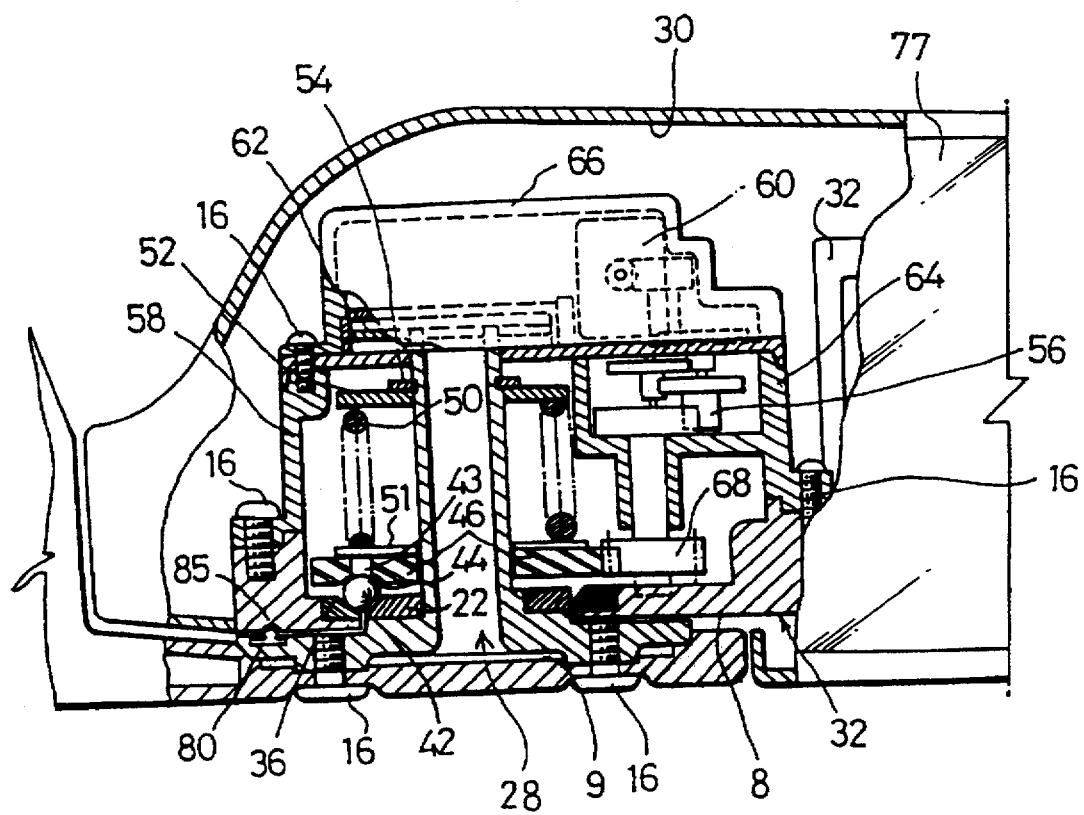
FIG. 2 is a partially sectional view of an electrically controllable rear mirror provided with the regulating device of FIG. 1, showing a construction of the assembled regulating device.

With reference to the accompanying drawings, there is shown a regulating device for a motor-driven foldable rear view mirror in accordance with a preferred embodiment of the present invention. In the regulating device, a shaft 28 is vertically coupled to a base plate 9, which base plate 9 is externally mounted to an automobile body. A frame 32 is supported by the shaft 28 so that a horizontal bed 8 of the frame 32 is placed about the shaft 28 so that the housing frame 32 is supported by the shaft 28. In this state, a mirror housing 30 having a mirror 77 can be controlled in its position relative to the automobile body in the manner as described below. A drive unit 60 as well as reduction gears 56 is provided on the frame 32. An end gear 68 of the reduction gears 56 gears into a shaft gear 46, so that the mirror housing 30 is moved centering around the shaft 28 by the rotational force of the drive unit 60.

In the drawings, the reference numeral 22 is a shaft reinforcing ring or an inside reinforcing ring fitted over the lower section of the shaft 28. The shaft reinforcing ring 22 is provided with a plurality of U-shaped slots 38 on its upper outside edge so that the slots 38 are spaced out at regular intervals. Meanwhile, the frame 32 has a ring seat 72 for seating thereon an outside reinforcing ring or a frame reinforcing ring 36. The upper inside edge of the frame reinforcing ring 36 is provided with a plurality of V-shaped slots 33 having their guide surfaces 35. The second slots 33 of the frame reinforcing ring 36 are spaced out at regular intervals, so that the slots 33 will be opposed to the first slots 38 of the shaft reinforcing ring 22 when the elements are assembled into the instant regulating device. In addition, the bottom surface 45 of the shaft gear 46 has a plurality of hemispherical guide depressions 44 as shown in FIG. 1, which depressions 44 in turn have their ball seating holes 43 near their center portions.

When assembling the elements into the regulating device, a plurality of regulating members or regulating balls 42 are seated, after fitting the frame 32 over the shaft 28, on depressions defined by the slots 33 and 38 of the reinforcing rings 36 and 22. Thereafter, the shaft gear 46 is placed over the reinforcing rings 22 and 36 with interposition of the regulating balls 42, so that the regulating balls 42 are placed in their associated hemispherical guide depressions 44 of the shaft gear 46 and can move radially with respect to the shaft 28. After placing the shaft gear 46, a biasing member or a compression coil spring 50 is placed on the top surface of the shaft gear 46 with interposition of a bottom washer 51. The top of the spring 50 is stopped by a top washer 52, so that the reinforcing rings 22 and 36 are tightly compressed by the spring force of the spring 50 and tightly kept in their places during a regulating operation of the device.

In the drawings, the reference numeral 16 denotes a fixing screw for fixing a top cover 66 to a frame cover 58, 54 denotes a washer pin, 62 denotes a positional control unit, 64 denotes a reduction gear housing, 70 denotes a friction reducing washer, 71 denotes a shaft hole of the frame 32, 74 denotes a washer pin coupling slit of the shaft 28, 75 denotes a slot for preventing random rotation of the shaft reinforcing ring 22, 76 denotes screw holes of the frame 32, 78 denotes a stop Jaw which will be engaged with the slot 75 for preventing random rotation of the shaft reinforcing ring 22, 80 denotes a slot for preventing random rotation of the frame reinforcing ring 36, and the numeral 82 denotes a stop Jaw which will be engaged with the slot 80 so as to prevent random rotation of the frame reinforcing ring 36.

Therefore, each of the regulating balls 42 under pressure are normally seated in the spherical space defined by the guide depressions 44 of the shaft gear 46 and the slots 33 and 38 as shown in FIG. 3A. The slots 38 have steeper side walls than those of the slots 33 and the guide depressions 44 to have the associated portions of the regulating balls 42 held therein as the remaining portions of the balls 42 latch the shaft gear 46 to allow the controlled rotation of the frame 32 about the gear 46 and the shaft 28 by the motor drive or an external force while providing the regulation on the rotation of the reinforcing ring 36 and thus the frame 32.

When the drive unit 60 starts in the above state, the end gear 68 of the reduction gears 56 is rotated by the rotating force of the drive unit 60. Since the end gear 68 gears into the shaft gear 46, the shaft gear 46 is rotated by the rotating force of the unit 60 transmitted thereto through the end gear 68. At this time, the engaging force between the regulating balls 42 and the slots 38 of the shaft reinforcing ring 22 is stronger than the engaging force between the regulating balls 42 and the slots 33 of the frame reinforcing ring 36. Therefore, the regulating balls 42 are separated from their associated slots 33 of the frame reinforcing ring 36 but roll upon and move out of the side walls of the slots 38 of the shaft reinforcing ring 22 respectively.

At this time, the regulating balls 42 placed in the hemispherical guide depressions 44 of the shaft gear 46 radially inwardly move and latches the shaft gear 46 as shown in FIG. 3B. Thus, the mirror housing 30, the frame 32, and the ring 36 may be rotated together by the motor drive about the latched shaft gear 46 overcoming the engaging force of the balls 42 to the desired position by the user.

When the rear view mirror is suddenly applied with an external impact, the mirror housing 30 may be turned about the shaft 28 without a motor drive imparted to the end gear 68 of the reduction gears 56. At this time, there is no displacement of the frame reinforcing ring 36 relative to the shaft gear 46. Therefore, the regulating balls 42 are separated from their associated hemispherical guide depressions 44 of the shaft gear 46 and, at the same time, the shaft gear 46 with the engaged end gear 68 is rotated about the shaft 28 together with a rotating unit including the mirror housing 30, the frame 32, and the ring 36 as shown in FIG. 3C.

As described above, a regulating device for a motor-driven foldable rear view mirror of the present invention includes a shaft reinforcing ring fitted over a lower section of a shaft, which shaft reinforcing ring has a plurality of U-shaped slots on its upper outside edge. In addition, a frame reinforcing ring is seated on a ring seat of a frame, which frame reinforcing ring has a plurality of second V-shaped slots on its upper inside edge. When assembling the elements into the regulating device, a plurality of regulating balls are seated, after fitting the frame over the shaft, on depressions defined by the slots of the reinforcing rings. Thereafter, the shaft gear is placed over the reinforcing rings with interposition of the regulating balls, so that the regulating balls are placed in their associated guide depressions of the shaft gear and can move radially of the shaft. After placing the shaft gear, a biasing member is placed on the shaft gear, so that the reinforcing rings are tightly compressed by the spring force of the biasing member and tightly kept in their places during a regulating operation of the device.

With the above structure, the instant regulating device needs no means for keeping predetermined angular distances between the regulating balls and for preventing sudden separation of the regulating balls during regulating motion of the device, thus to reduce the number of elements and to reduce the cost. Another advantage of the instant regulating device resides in that it prevents random motion of a mirror housing, thus to prevent trouble of the device and to improve operational stability of the device. Furthermore, the regulating device provides a safe backward sight for a driver and lets the driver make safe driving.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for regulating a motor-driven foldable rear view mirror of an automobile comprising a shaft coupled to a base plate externally mounted to an automobile body, a frame placed about said shaft for supporting a mirror housing foldably over said automobile, a drive unit fixed to said frame, a plurality of reduction gears connected to said drive unit and having an end gear, and a shaft gear gearing into said end gear so as to move said mirror housing centering around the shaft by rotational force of said drive unit, further comprising:

a first flat ring fitted over a lower section of said shaft, said first flat ring having a plurality of U-shaped slots on its upper outside edge;

a second flat ring seated on a seat of said frame and placed about said first flat ring, said second flat ring having a plurality of V-shaped slots on its upper inside edge, said V-shaped slots being opposed to said U-shaped slots of the first flat ring respectively;

said shaft gear fitted over said shaft above said first and second flat rings, said shaft gear having a plurality of guide depressions on its bottom surface;

a plurality of regulating members seated on the slots of said first and second flat rings and placed in the guide depressions of said shaft gear respectively so as to be radially movable with respect to said shaft; and a spring placed on said shaft gear and compressing said first and second flat rings;

where said U-shaped slots have sides more steeply sloped than said V-shaped slots and said guide depressions so that said frame can be rotated about said shaft under the condition that said first and second flat rings are kept in their places with said regulating members caught in a generally hemispherical portion defined by said guide depressions of said shaft gear and said slots of said first and second flat rings.

* * * * *